United States Patent

Falandino et al.

[11] Patent Number: 6,076,348
[45] Date of Patent: Jun. 20, 2000

[54] ENGINE OPERATING SYSTEM FOR MAXIMIZING EFFICIENCY AND MONITORING PERFORMANCE OF AN AUTOMOTIVE EXHAUST EMISSION CONTROL SYSTEM

[75] Inventors: Michael Patrick Falandino, Wyandotte; Thomas Scott Gee, Canton; Robert William Ridgway, Royal Oak, all of Mich.

[73] Assignee: Ford Motor Company, Dearborn, Mich.

[21] Appl. No.: 09/105,605

[22] Filed: Jun. 26, 1998

[51] Int. Cl.[7] .................................................. F01N 3/00
[52] U.S. Cl. .................................. 60/276; 60/285; 60/277
[58] Field of Search ............................. 60/285, 274, 276, 60/277, 286

[56] References Cited

U.S. PATENT DOCUMENTS

| | | |
|---|---|---|
| 5,289,678 | 3/1994 | Grutter . |
| 5,375,415 | 12/1994 | Hamburg et al. . |
| 5,379,590 | 1/1995 | Hamburg et al. . |
| 5,383,333 | 1/1995 | Logothetis et al. . |
| 5,417,060 | 5/1995 | Ishida et al. ............................... 60/276 |
| 5,497,618 | 3/1996 | Brailsford et al. . |
| 5,537,816 | 7/1996 | Ridgway et al. . |
| 5,598,703 | 2/1997 | Hamburg et al. . |
| 5,653,102 | 8/1997 | Orzel et al. . |
| 5,653,104 | 8/1997 | Hamburg et al. ......................... 60/285 |

FOREIGN PATENT DOCUMENTS

| | | |
|---|---|---|
| 0799987 A2 | 10/1997 | European Pat. Off. . |
| 2307313 | 5/1997 | United Kingdom . |

*Primary Examiner*—Thomas Denion
*Assistant Examiner*—Binh Tran
*Attorney, Agent, or Firm*—Jerome R. Drouillard

[57] ABSTRACT

An engine operating system includes an exhaust aftertreatment device and a fuel delivery system for providing fuel to the engine so as to cause the engine's air/fuel ratio to vary on a periodic basis. The exhaust aftertreatment device has a window of maximum operating efficiency characterized by storage and release of an exhaust constituent within the aftertreatment device. A controller operates the fuel delivery system and performs a statistical analysis of signals from an exhaust constituent concentration sensor downstream of the exhaust aftertreatment device, so as to assure that the exhaust aftertreatment device is being operated within its window of most efficient operation.

14 Claims, 5 Drawing Sheets

ENGINE OPERATING SYSTEM FOR MAXIMIZING EFFICIENCY AND MONITORING PERFORMANCE OF AN AUTOMOTIVE EXHAUST EMISSION CONTROL SYSTEM

FIELD OF THE INVENTION

The present invention deals with a system for maximizing the efficiency of an automotive exhaust emission control system and specifically for monitoring the performance of an aftertreatment device included in the emission control system.

DISCLOSURE INFORMATION

Many exhaust aftertreatment devices utilized with automotive vehicles have conversion efficiencies which are greatly influenced by the air/fuel ratio at which the engine is operating. As an example, three-way catalysts (TWC), which are commonly employed with automotive vehicles, work best when the air/fuel ratio of the engine varies in a controlled oscillation about a fairly narrow band. This narrow band, commonly called a "window", is characterized, in the case of a TWC, by both the storage of oxygen within the catalyst when the engine shifts lean of stoichiometry, and the release of oxygen from the catalyst when the engine shifts rich of stoichiometry. This occurs while air/fuel ratio is being varied about stoichiometry while the catalyst is operating at its most efficient regime.

FIG. 2 illustrates outputs of proportional exhaust oxygen sensors mounted upstream and downstream of a three-way catalyst. It is noted that the upstream sensor indicates that the air/fuel ratio is steadily either increasing or decreasing at a fairly constant slope. In contrast, the downstream sensor, which could comprise a universal exhaust gas oxygen sensor (commonly called a "UEGO), or some other type of exhaust gas sensor having an output which is proportional to the concentration of oxygen. Alternatively, a sensor having an output proportional to another exhaust gas constituent such as unburned hydrocarbon, could be utilized in a system according to the present invention.

The slope of the downstream sensor's output changes when the aftertreatment device, in this case a TWC, is operating within the window. Thus, it is noted that at locations A and B the slope of the downstream sensor's output decreases dramatically; this is because the oxygen content of the exhaust stream leaving the catalyst changes very slowly, notwithstanding that the air/fuel ratio of the feedgas, as evidenced by the upstream sensor output, is continuing to change at a measurably more rapid rate. This hysteresis in the oxygen being discharged from the TWC is a clear indicator of the window where the catalyst operates most efficiency, and the hysteresis phenomenon may be used to control operation, particularly the air/fuel ratio, of an aftertreatment device such as a catalyst according to the present invention.

Conventional emission control systems for use in automotive vehicles equipped with TWC's require that the exhaust gas oxygen content of the exhaust leaving the TWC be carefully calibrated according to the particular needs of the vehicle and the particular composition of the washcoat carried upon a substrate within the TWC, as well as the composition of the exhaust sensors, whether upstream or downstream of the catalyst. Unfortunately, the precise air/fuel ratio required to achieve operation at maximum efficiency, i.e., operation within the window, may vary from vehicle to vehicle, and for the same vehicle that variance may be considerable during the life of the vehicle. These variations may result from such things as different formulations of gasoline, for example, gasoline containing methanol/ethanol, or other oxygenated components or additives will certainly affect the operation of a TWC. Also, fuel aging or Reid Vapor Pressure (RVP) will affect the air/fuel ratio operating point at which a TWC, or for that matter other types of exhaust aftertreatment devices, will operate most efficiently. Other factors, such as exhaust air leaks upstream of the catalyst, contamination of the catalyst, contamination of exhaust gas oxygen sensors, the chemistry of the catalyst, the chemistry of the sensor, and differences in cylinder-to-cylinder air/fuel ratio may also affect the closed loop mean air/fuel ratio of an engine air/fuel control system, and thus, the operation of a catalyst. All of these causes are important because prior art systems such as that described in U.S. Pat. No. 5,537,816, which is assigned to the assignee of the present invention, relied upon fixed air/fuel ratios which were calibrated into the engine control system. And, because the fixed air/fuel ratio was not always correct for maximum catalyst efficiency, it was not possible to attain the conversion of exhaust system constituents which would otherwise be possible.

The present invention solves the foregoing problems by allowing the entire emission control system, which encompasses at least the engine's fuel control system as well as any aftertreatment devices, to be treated as an entire system.

SUMMARY OF THE INVENTION

An engine operating system, including an exhaust gas aftertreatment device, has a fuel delivery system for providing fuel to the engine so as to cause the engine's air/fuel ratio to vary on a periodic basis. The exhaust gas aftertreatment device has a window of maximum operating efficiency, with the window being characterized by storage of an exhaust constituent within the aftertreatment device when the device is operating in the window. The window itself may be identified with an air/fuel ratio, the precise value of which may change as the aftertreatment device changes.

A sensor located downstream from the exhaust gas aftertreatment device measures the concentration of the stored exhaust constituent in the exhaust gas flowing from the aftertreatment device and generates a concentration signal having a value which is proportional to the concentration of the stored exhaust constituent.

A controller operates the fuel delivery system and receives the concentration signals. The controller determines the statistical mode of the concentration signals. As used herein, the term "mode", as in classical statistical theory, means the most common observation or measurement.

The controller also determines a measure of variation of the concentration signals from the mode. In a preferred embodiment, the measure of variation is the standard deviation about either side of the mode. Finally, the controller biases the fuel delivery system to minimize variation from the mode. In other words, the controller biases the fuel delivery system to place the operating point of the exhaust gas aftertreatment device within the window to the extent that the aftertreatment device operates at maximum efficiency.

In a preferred embodiment, the sensor measures the concentration of oxygen in the exhaust, and the controller determines a shift in the engine's air/fuel ratio to maximize the mode of the concentration signal.

The exhaust gas aftertreatment device may comprise either a NOx trap, a three-way catalyst, or other types of aftertreatment devices known to those skilled in the art and suggested by this disclosure. In the event that the exhaust gas aftertreatment device comprises a three-way catalyst, or other types of devices known to those skilled in the art, with a sensor measuring exhaust gas oxygen concentration, the controller may operate the fuel delivery system so as to cause the engine's air/fuel ratio to vary from rich to lean of stoichiometric on a periodic basis. In any event, the controller will operate the fuel delivery system so as to both maximize the mode of the oxygen concentration signal and minimize variations between the standard deviations of rich and lean operation about the mode.

In the event that either the variation of the concentration signals exceeds a predetermined threshold, or the magnitude of the mode of the concentration signals is less than a second predetermined threshold, the controller will output a signal indicating that the exhaust gas aftertreatment device is defective.

In the event that the air/fuel ratio is varied on a periodic basis through the action of the controller, an exhaust sensor may be placed before the exhaust gas aftertreatment device for the purpose of controlling the air/fuel ratio of the feed gas entering the aftertreatment device.

With a three-way catalyst, the window will be characterized by storage and release of exhaust gas oxygen from the three-way catalyst when the fuel delivery system is operating such that the air/fuel ratio of the gases entering the catalyst oscillates from lean to rich of stoichiometry.

It is an advantage of the present invention that an exhaust aftertreatment device may be controlled so that the device operates within its window of greatest efficiency, notwithstanding influences such as fuel composition, variations in catalyst composition, and other variables. In effect, the present system allows the engine controller to adapt to changes in the aftertreatment system.

It is a further advantage of the present system that inefficient operation of the aftertreatment device may be reliably detected and reported.

Other advantages, as well as objects and features of the present invention will become apparent to the reader of this specification.

DETAILED DESCRIPTION OF PREFERRED EMBODIMENTS

Figure 1:
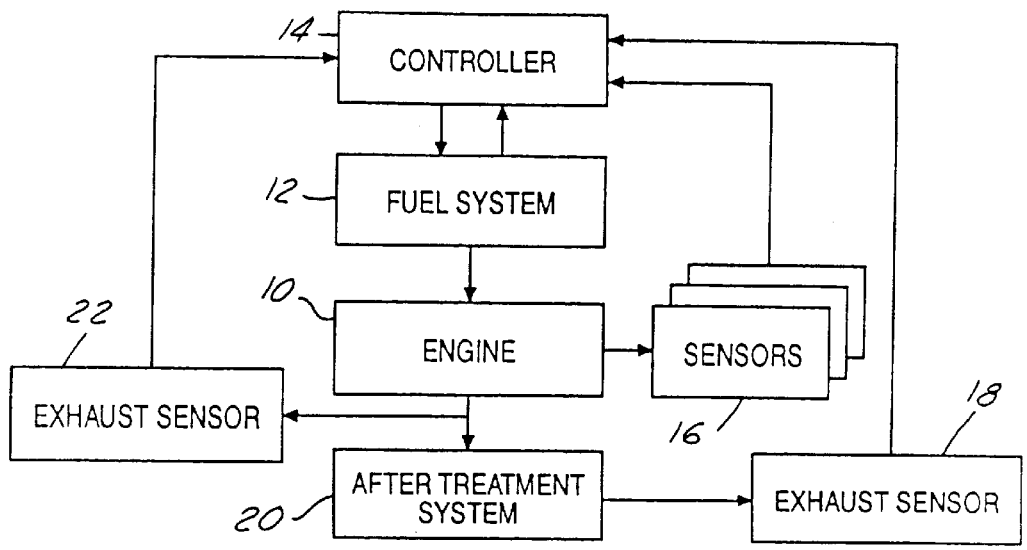
FIG. 1 is a schematic representation of an automotive engine having an operating system according to the present invention.

As shown in FIG. 1, engine 10 is supplied with fuel by means of fuel system 12 which is operated by controller 14. Controller 14 may be drawn from a class of controllers known to those skilled in the engine control art and suggested by this disclosure.

Controller 14 receives inputs from a battery of sensors 16, which measure such operating parameters as engine speed, engine load, ambient temperature, coolant temperature, throttle position, vehicle speed, fuel quality, and other types of inputs known to those skilled in the art and suggested by this disclosure. An exhaust constituent sensor 18 is mounted downstream of an aftertreatment system 20. Exhaust sensor 18 serves the purpose of providing a concentration signal for measuring the concentration of a stored exhaust constituent within exhaust gas flowing from aftertreatment device or system 20, with sensor 18 generating a concentration signal having a value which is proportional to the concentration of the stored exhaust constituent. Sensor 18 outputs signals to controller 14 to enable controller 14 to perform the statistical analysis of the signals described herein. Aftertreatment system 20 may comprise a device such as a three-way catalyst or NOx trap, or other type of aftertreatment device known to those skilled in the art and suggested by this disclosure.

Exhaust sensor 22, which communicates with controller 14, serves to allow controller 14 to vary the air/fuel ratio of the feedgas entering aftertreatment system 20. Aftertreatment system 20 is termed a "system" because the system may comprise more than one catalyst, or a catalyst having more than one substrate contained therein, or a catalyst with the ability to reduce or oxidize more than one exhaust feedgas constituent.

Figure 2:
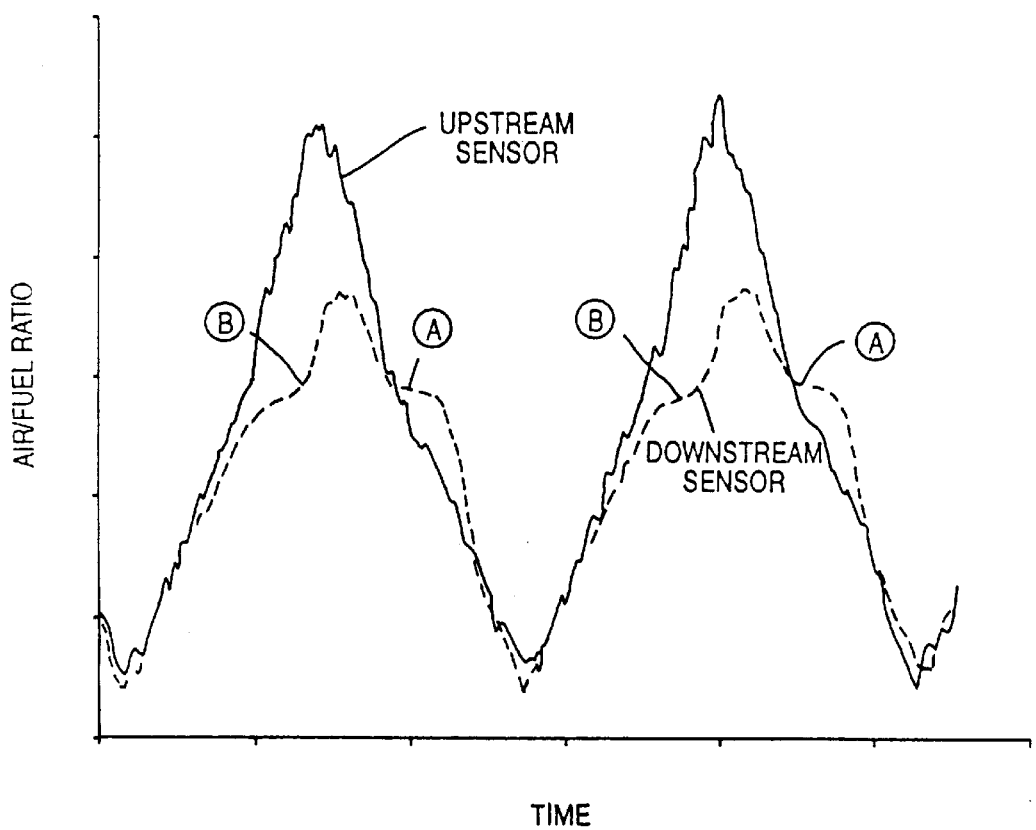
FIG. 2 illustrates the outputs of exhaust gas oxygen sensors mounted both upstream and downstream from a three-way catalyst according to the present invention.

As noted above, FIG. 2 illustrates that downstream sensor 18 will have a hysteresis effect due to the storage of an exhaust gas component, in this case oxygen from a three-way catalyst. This hysteretic effect means that the outputs from downstream exhaust sensor 18 will tend to exhibit a statistical distribution characterized by a very high level mode, with little deviation about the mode when the aftertreatment device 20 is operating in the window characterized by maximum efficiency.

Figure 3A:
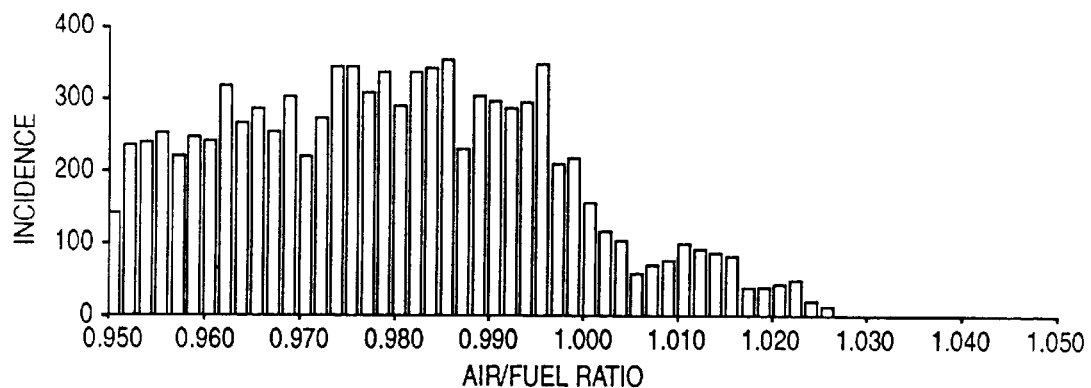
FIGS. 3–5 illustrate statistical analyses of the output of an exhaust sensors mounted both upstream and downstream of a three-way catalyst according to one aspect of the present invention.

FIG. 3A illustrates a fuel-rich operating condition for a three-way catalyst. Notice that FIG. 3A, which is a histogram of the air/fuel ratio entering the catalyst, is scattered, and the air/fuel ratio measured with a UEGO downstream from the catalyst, is skewed to one side of the mode, which is located clearly identifiable as the point of maximum amplitude.

Figure 3B:
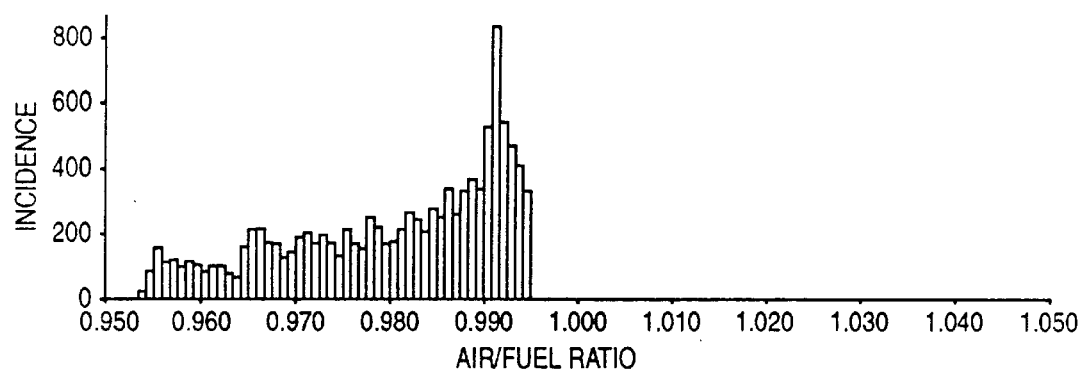
Figure 4A:
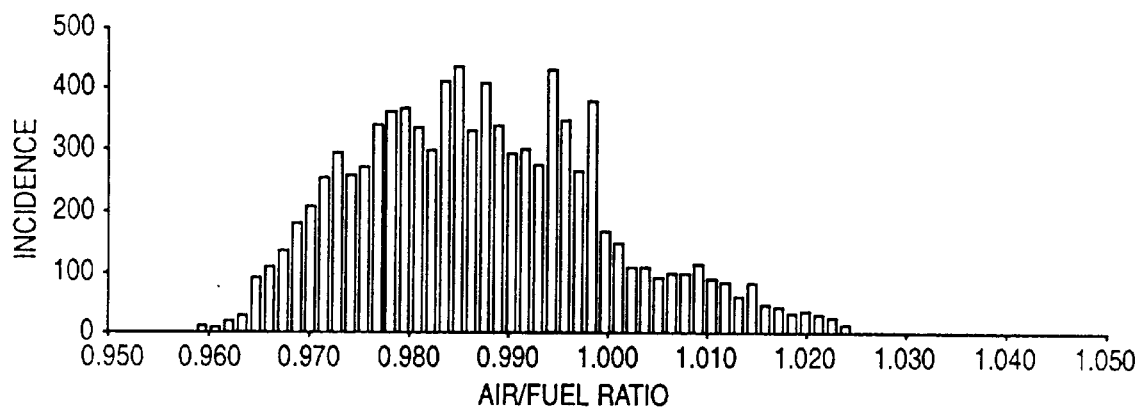
Figure 4B:
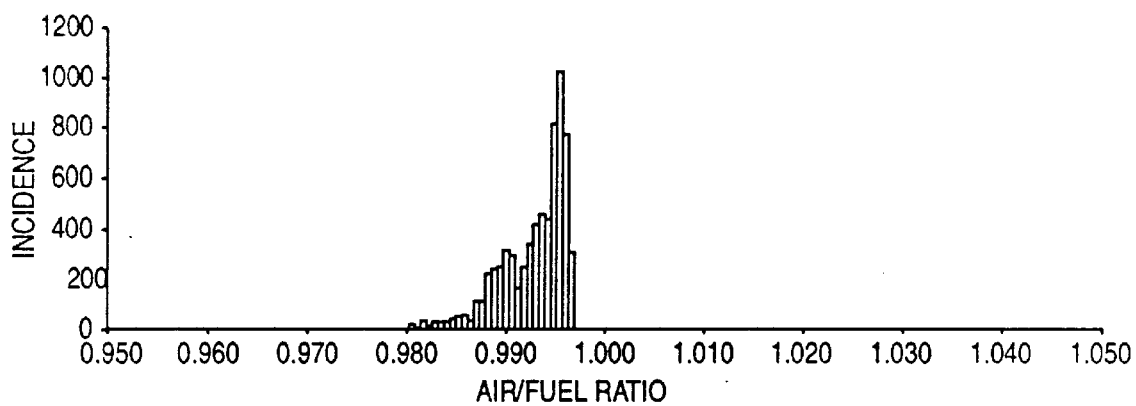

In response to this skewed air/fuel ratio, controller 14 will attempt to adjust the air/fuel ratio, and such an adjustment is shown in FIGS. 4A and 4B. It is noted that in FIG. 4A, the distribution appears to be more of a normal distribution than does the distribution of FIG. 3A, and, in FIG. 4B, it is noted that the distribution is tighter with respect to the mode and less scattered than is FIG. 3B.

Figure 5A:
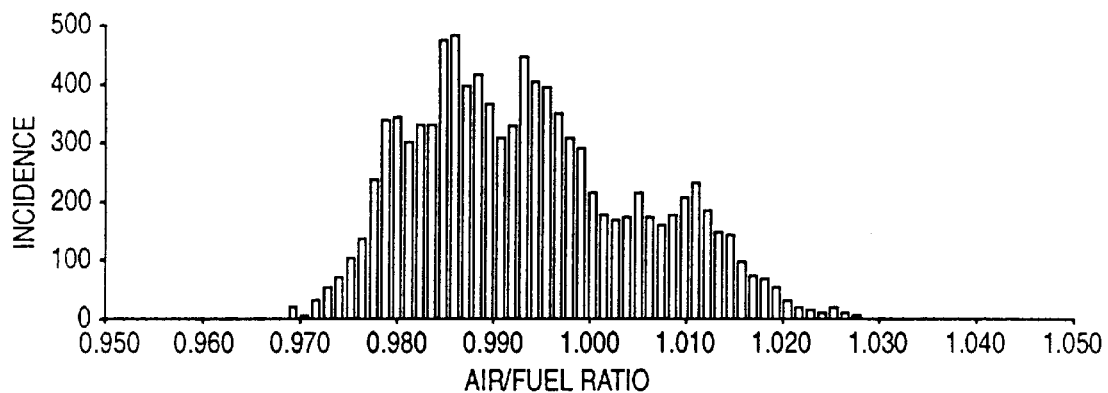
Figure 5B:
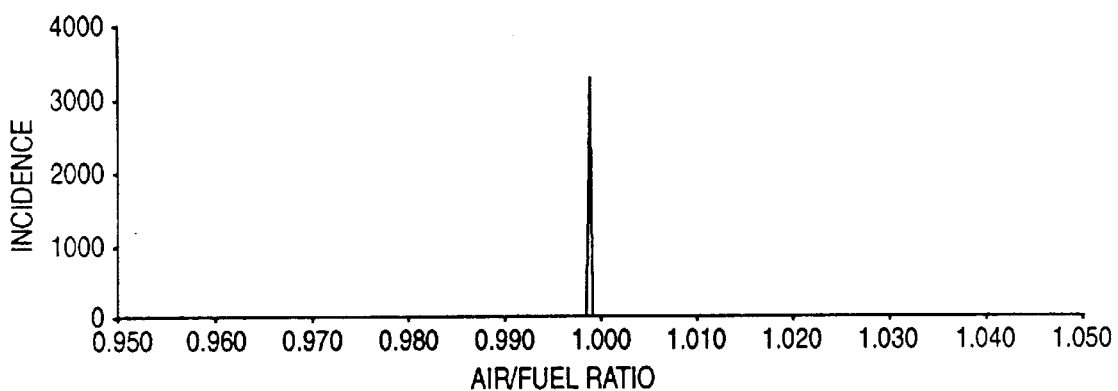

Finally, if an adjustment is made to cause a further enleanment of the air/fuel ratio, the mode plot will appear as shown in FIG. 5B, where the mode is at its maximum level. Notice that the incidence of the mode grows from approximately 750 in FIG. 3B, to approximately 1100 in FIG. 4B, and approximately 3200 in FIG. 5B. It is also noted that the variation on either side of the mode is symmetrical. This means that the catalyst, in this case a three-way catalyst, is effectively operating within its window at maximum efficiency.

Figure 6:
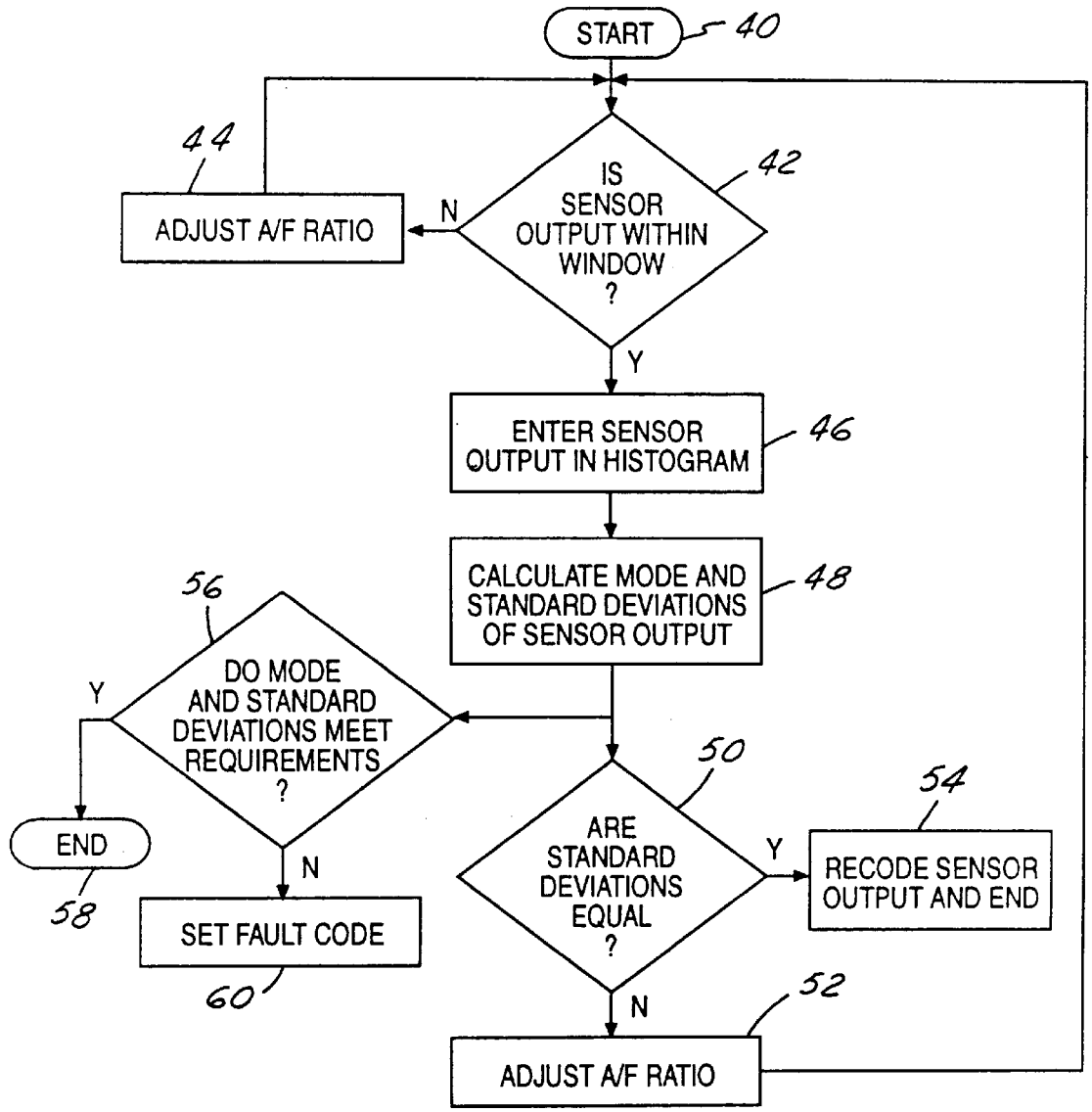
FIG. 6 is a flow diagram illustrating operation of a system according to the present invention.

FIG. 6 illustrates the manner in which a system according to the present invention operates. Starting at 40, controller 42 checks the output of sensor 18 at block 42 to determine whether aftertreatment device 20 is operating within its window. In other words, is the output of sensor 18 within a previously recorded value corresponding to the window?

In the event that the output of sensor 18 is not within a previously recorded window value, at block 44 controller 14 adjusts the air/fuel ratio either rich or lean depending on the sensor output. If the sensor output shows a rich operating condition, controller 14 will command fuel system 12 to furnish less fuel to engine 10, and vice versa. Once the output of sensor 18 is within the window at block 42, controller 14 moves to block 46 wherein the sensor output is entered into a histogram routine within controller 14. This histogram will have a form of the type illustrated in FIGS. 3B, 4B, and 5B. Moving to block 48, controller 14 calculates the mode and standard deviations (on both sides of the mode) of output of sensor 18. At block 50, controller 14 asks the question: are the standard deviations equal? If they are not equal, the air/fuel ratio is again adjusted at block 52 to shift the air/fuel ratio in a manner shown in FIGS. 3A, 3B, 4A, 4B, 5A and 5B. At block 50, if the answer is yes, in other words the standard deviations of the signal of exhaust sensor 18 about the mode of the signal are equal, the routine moves to block 54 where the sensor output value is recorded and the routine ends. The routine will be periodically re-run during the operation of engine 10 so as to assure that aftertreatment system 20 is operated within its window.

After block 48, specifically, at block 56 controller 14 asks the question: do the mode and standard deviations meet requirements? If the answer is yes, the watchdog routine ends. If the answer is no, the watchdog routine moves to block 60 where a fault code is set. The requirements referred to in block 56 are that the mode must have a certain minimum value to assure that the catalyst is still capable of performing its conversion job and the standard deviations or other types of statistical variants, which may be selected from those known to those skilled in the art and in view of this disclosure, do not exceed predetermined thresholds. This is important because if the answer is no at block 56, the requirements of various governmental bodies regarding on-board diagnostics of emission control systems require that the fault code be set at block 60.

The present system, as noted above, is important because it allows not only fine, adaptive uning of an emission control system to account for ariations in sensor output, fuel quality, ambient onditions, and other factors affecting the efficiency of a converter, but also because it allows an emission control system to comply with on-board diagnostic requirements in a robust fashion.

While the invention has been shown and described in its preferred embodiments, it will be clear to those skilled in the arts to which it pertains that many changes and modifications may be made thereto without departing from the scope of the invention.

What is claimed is:

1. An engine operating system including an exhaust aftertreatment device, with said system comprising:
    a fuel delivery system for providing fuel to the engine so as to cause the engine's air/fuel ratio to vary on a periodic basis;
    an exhaust aftertreatment device having a window of maximum operating efficiency, with said window being characterized by storage of an exhaust constituent within the aftertreatment device when the aftertreatment device is operating in the window;
    a sensor, located downstream from the exhaust aftertreatment device, for measuring the concentration of the stored exhaust constituent in exhaust gas flowing from the aftertreatment device and for generating a concentration signal having a value which is proportional to said concentration;
    a controller for operating the fuel delivery system and for receiving the concentration signals and for determining the mode of the concentration signals, as well as a measure of variation of the concentration signals from the mode, with the controller biasing the fuel delivery system to minimize variation from the mode;
    and with the controller outputting a signal indicating that the aftertreatment device is defective in the event that the variation of the concentration signals exceeds a predetermined threshold.

2. An engine operating system according to claim 1, wherein the sensor measures the concentration of oxygen in the exhaust and the controller determines a shift in the engine's air/fuel ratio to maximize the mode of the concentration signal.

3. An engine operating system according to claim 1, wherein the exhaust aftertreatment device comprises a NOx trap.

4. An engine operating system according to claim 1, wherein the exhaust aftertreatment device comprises a three-way catalyst.

5. An engine operating system according to claim 1, wherein the exhaust aftertreatment device comprises a three-way catalyst, with the sensor measuring exhaust gas oxygen concentration, and with the controller operating the fuel delivery system so as to cause the engine's air/fuel ratio to vary from rich to lean of stoichiometric on a periodic basis.

6. An engine operating system according to claim 5, wherein the controller operates the fuel delivery system so as to both maximize the mode of the oxygen concentration signal and minimize variations between the standard deviations of rich and lean operation about the mode in a symmetrical manner.

7. An engine operating system according to claim 1, wherein the exhaust aftertreatment device comprises a NOx trap, with the sensor measuring exhaust gas oxygen concentration, and with the controller operating the fuel delivery system so as to cause the engine's air/fuel ratio to vary about a predetermined operating point.

8. An engine operating system according to claim 1, wherein the engine's air/fuel ratio varied on a periodic basis through the action of a controller using input from an exhaust sensor placed before the exhaust aftertreatment device.

9. An engine operating system according to claim 1, wherein the controller outputs a signal indicating that the aftertreatment device is defective in the event that the magnitude of the mode is less than a predetermined threshold.

10. An engine operating system according to claim 1, wherein the controller outputs a signal indicating that the aftertreatment device is defective in the event that the variation of the concentration signals about the mode exceeds a predetermined threshold and the magnitude of the mode is less than a predetermined threshold.

11. An engine operating system including an exhaust aftertreatment device, with said system comprising:
    a fuel delivery system for providing fuel to the engine so as to cause the engine's air/fuel ratio to vary from rich to lean of stoichiometric on a periodic basis;
    a three-way catalyst having a window of maximum operating efficiency, with said window being characterized by storage and release of an exhaust constituent within the catalyst when the catalyst is operating within the window;
    a sensor, located downstream from the catalyst, for periodically measuring the concentration of the stored exhaust constituent in exhaust gas flowing from the catalyst and for generating a concentration signal having a value which is proportional to said concentration;

a controller for operating the fuel delivery system and for receiving the concentration signals and for determining the mode of the concentration signals as well as a measure of variation of the concentration signals from the mode in both the rich and lean directions, with the controller biasing the fuel delivery system to both maximize the mode of the concentration signal and to minimize variation from the mode;

and with said engine operating system further comprising a watchdog routine within the controller for periodically measuring the variation of the concentration signal from the mode and for outputting a signal indicating that the three-way catalyst is defective in the event that the variation of the concentration signals exceeds a predetermined threshold.

12. An engine operating system according to claim 11, further comprising a watchdog routine within the controller for periodically measuring the variation of the concentration signal from the mode and for outputting a signal indicating that the three-way catalyst is defective in the event that the magnitude of the mode is less than a predetermined threshold.

13. An engine operating system according to claim 11, further comprising a watchdog routine within the controller for periodically measuring the variation of the concentration signal from the mode and for outputting a signal indicating that the three-way catalyst is defective in the event that the variation of the concentration signal about the mode exceeds a predetermined threshold and the magnitude of the mode is less than a predetermined threshold.

14. An engine operating system according to claim 11, wherein said exhaust constituent comprises oxygen.

* * * * *